(12) United States Patent
Ko et al.

(10) Patent No.: US 7,330,469 B2
(45) Date of Patent: Feb. 12, 2008

(54) INTERNET PROTOCOL ADDRESS LOOKUP SYSTEM AND METHOD USING THREE-LAYER TABLE ARCHITECTURE

(75) Inventors: Nam Seok Ko, Daejeon (KR); Dong Yong Kwak, Daejeon (KR)

(73) Assignee: Electronics & Telecommunications Research Institute (KR)

( * ) Notice: Subject to any disclaimer, the term of this patent is extended or adjusted under 35 U.S.C. 154(b) by 795 days.

(21) Appl. No.: 10/723,829

(22) Filed: Nov. 25, 2003

(65) Prior Publication Data

US 2004/0105442 A1 Jun. 3, 2004

(30) Foreign Application Priority Data

Nov. 27, 2002 (KR) .................. 10-2002-0074352

(51) Int. Cl.
*H04L 12/54* (2006.01)
(52) U.S. Cl. .................. 370/392; 370/395.31
(58) Field of Classification Search .......... 370/392
See application file for complete search history.

(56) References Cited

U.S. PATENT DOCUMENTS

| 6,141,738 A | 10/2000 | Munter et al. |
| 6,157,644 A * | 12/2000 | Bernstein et al. ........... 370/392 |
| 6,993,031 B2 * | 1/2006 | Murase ................. 370/395.32 |
| 7,065,084 B2 * | 6/2006 | Seo ........................... 370/392 |
| 7,154,892 B2 * | 12/2006 | Oh et al. .................... 370/392 |

OTHER PUBLICATIONS

"Routing Lookups in Hardware at Memory Access Speeds", P. Gupta, et al., 8 pages.
"Scalable High Speed IP Routing Lookups", M. Waldvogel, et al., 12 pages.

* cited by examiner

*Primary Examiner*—Edan Orgad
*Assistant Examiner*—Jay P. Patel
(74) *Attorney, Agent, or Firm*—Blakely Sokoloff Taylor & Zafman

(57) ABSTRACT

Provided are an IP address lookup system and method for forwarding a packet over a data plane of a router. The IP address lookup system includes a forwarding table which has a three-layer table architecture so that it can search for each address group that constitutes an IP destination address of an input packet and a forwarding engine which obtains packet processing information and next hop information for the input packet by searching for the forwarding table using the IP destination address as a search key.

26 Claims, 7 Drawing Sheets

# INTERNET PROTOCOL ADDRESS LOOKUP SYSTEM AND METHOD USING THREE-LAYER TABLE ARCHITECTURE

BACKGROUND OF THE INVENTION

This application claims the priority of Korean Patent Application No. 2002-74352, filed on Nov. 27, 2002, in the Korean Intellectual Property Office, the disclosure of which is incorporated herein in its entirety by reference.

1. Field of the Invention

The present invention relates to a routing technique for transmitting packets to a desired destination over the Internet, and more particularly, to an Internet protocol (IP) address lookup system and method for forwarding a packet on a data plane of a router.

2. Description of the Related Art

As the number of Internet users has rapidly increased and Internet services have been remarkably diversified, Internet traffic has exponentially grown. Accordingly, a technique of searching for a desired destination to which a packet is to be transmitted as fast as possible and then forwarding the packet over the Internet has been suggested.

One of the main functions of a router is to forward a packet so that the packet can be successfully transmitted to a final destination. To forward a packet over the Internet, the router searches for an address and output port of a next hop router to which the packet is to be transmitted.

In the case of an early version of router, the time taken to search for and process a destination of a packet is shorter than the time taken to transmit the packet to the destination along a transmission path connected to the router. Thus, the early version of router can connect sub-networks to one another over the Internet without difficulty. These days, the time taken for a router to transmit a packet has been relatively reduced, as compared with the time taken for the router to search for and process the packet, and Internet traffic has exponentially increased. However, the performance of the router processing packets has not been enhanced in accordance with the speed of transmitting data. A backbone router capable of dealing with a few hundred giga bytes or a number of tera bytes, in particular, may undesirably serve as a bottleneck section on the Internet.

SUMMARY OF THE INVENTION

The present invention provides an IP address lookup system and method, which are capable of overcoming limits of a multi-bit trie and enhancing lookup speed by using a forwarding table having a multi-bit trie structure and comprised of three sub-tables in an IP address lookup.

According to an aspect of the present invention, there is provided an IP address lookup system. The IP address lookup system includes a forwarding table which has a three-layer table architecture so that it can search for each address group that constitutes an IP destination address of an input packet and a forwarding engine which obtains packet processing information and next hop information for the input packet by searching for the forwarding table using the IP destination address as a search key.

According to another aspect of the present invention, there is provided an IP address lookup method. The IP address lookup method involves (a) extracting an IP destination address from an input IP data packet; (b) extracting entries of a first table corresponding to eight most significant bits of the IP destination address; (c) extracting entries of a second table corresponding to a result of shifting fourteen bits following the eight most significant bits of the IP destination address by as much as a first shift bit; (d) extracting entries of a third table corresponding to a result of shifting twelve most significant bits of the IP destination address by as much as a second shift bit; and (e) extracting next hop information and packet processing information from a searched entry of the third table. Here, the first through third tables constitutes a forwarding table which enables each address group of the IP destination address to be searched for.

BRIEF DESCRIPTION OF THE DRAWINGS

The above features and advantages of the present invention will become more apparent by describing in detail exemplary embodiments thereof with reference to the attached drawings in which.

DETAILED DESCRIPTION OF THE INVENTION

Figure 1:
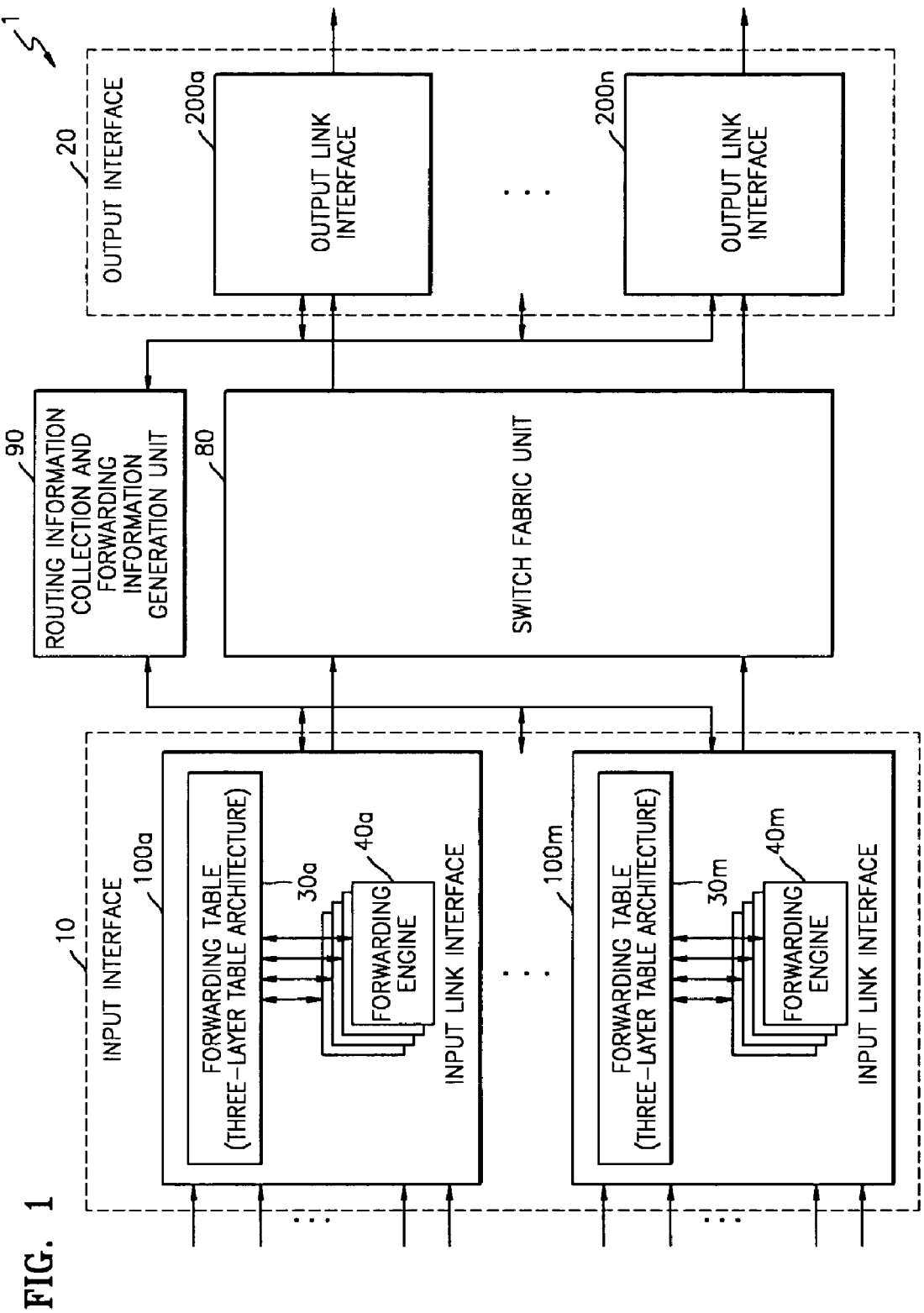
FIG. 1 is a schematic block diagram of a router having an IP address lookup system, which includes a three-layer table, according to a preferred embodiment of the present invention.

FIG. 1 is a schematic block diagram of a router 1 having an IP address lookup system, which includes a three-layer table, according to a preferred embodiment of the present invention. Referring to FIG. 1, the router 1 includes an input interface unit 10, an output interface unit 20, a switch fabric unit 80, and a routing information collection and forwarding information generation unit 90.

The input interface unit 10, which includes a plurality of input link interfaces 100*a* through 100*m*, carries out an IP address lookup using a destination address of an IP packet input into the router 1 via the input link interfaces 100*a* through 100*m*. Thereafter, the input interface unit 10 transmits the input packet to an input port of a switch included in the switch fabric unit 80 according to a result of the IP address lookup.

The switch fabric unit 80 performs traffic transmission between input and output ports of the router 1, and the output interface unit 20 transmits a packet to an output port in response to the result of the IP address lookup carried out by the input interface unit 10.

The routing information collection and forwarding information generation unit 90 collects routing information using a routing protocol, processes the collected routing information into forwarding information, and transmits the forwarding information to the input interface unit 10. The input interface unit 10 creates forwarding tables 30*a* through 30*m*, each comprised of three sub-tables, based on the forwarding information transmitted from the routing information collection and forwarding information generation unit 90.

An IP address lookup function according to the present invention can be applied to the input interface unit 10 and/or the output interface unit 20 of the router 1. Therefore, the input interface unit 10 may have a different structure than the one shown in FIG. 1. In other words, a functional block enabling an IP address lookup may be installed in the output interface unit 20 rather than in the input interface unit 10 or may be installed in both the input interface unit 10 and the output interface unit 20.

Figure 2:
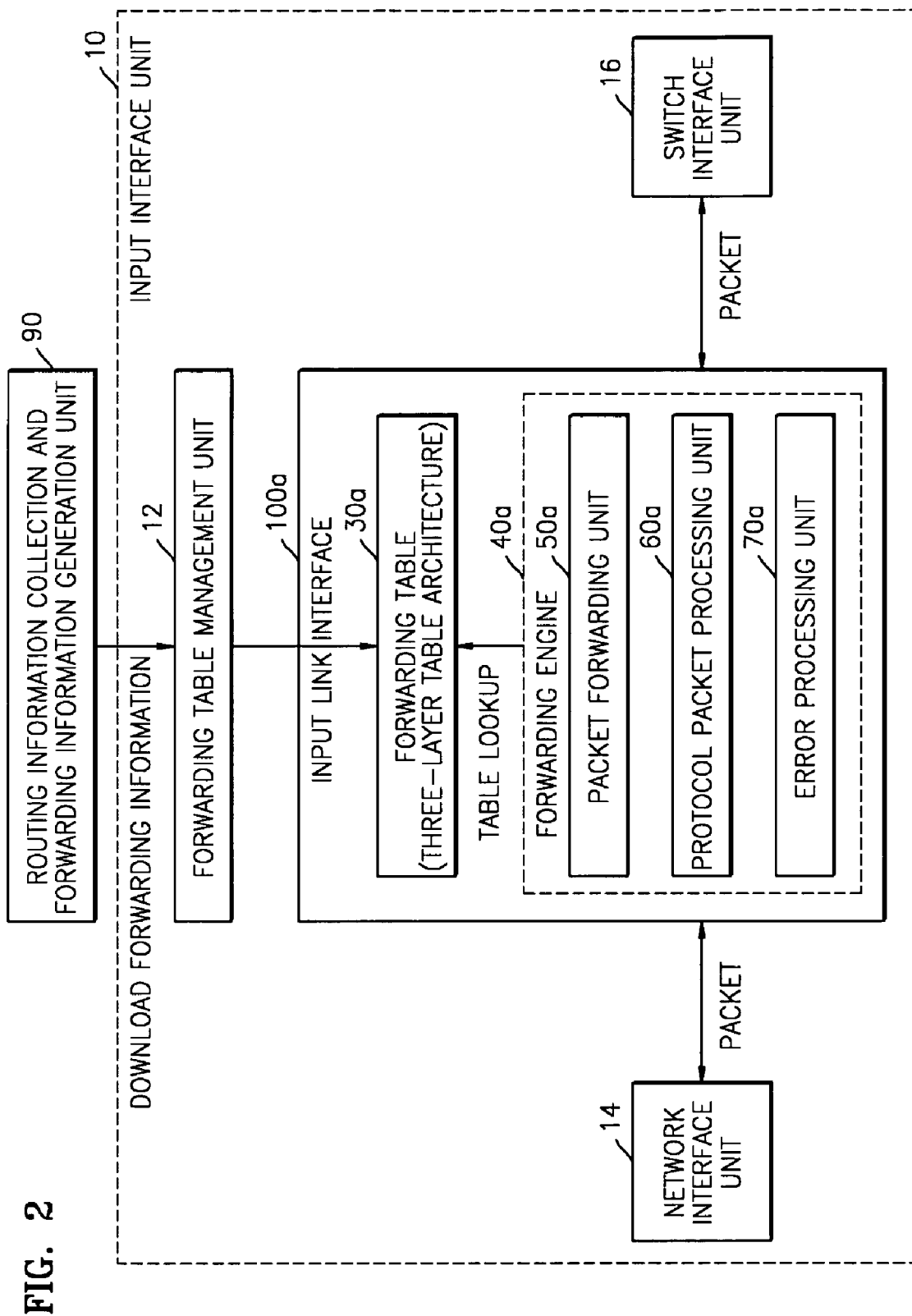
FIG. 2 is a block diagram of an input interface unit (i.e., an IP address lookup system) of FIG. 1.

FIG. 2 is a block diagram of the input interface unit 10 (i.e., an IP address lookup system) of FIG. 1. Referring to FIG. 2, the input interface unit 10, which includes a forwarding table management unit 12, a network interface unit 14, a switch interface unit 16, and at least one input link interface 100a, carries out physical packet processing and other basic packet processing on an input packet. The input link interface 100a includes a forwarding table 30a and a forwarding engine 40a. The forwarding engine 40a includes a packet forwarding unit 50a, a protocol packet processing unit 60a, and an error processing unit 70a.

The routing information collection and forwarding information generation unit 90 connected to the input interface unit 10 collects routing information using a routing protocol, processes the collected routing information into forwarding information, and transmits the forwarding information to the forwarding table management unit 12 through interprocessor communication (IPC).

The forwarding table management unit 12 downloads the forwarding information from the routing information collection and forwarding information generation unit 90 and creates and manages the forwarding table 30a using the downloaded forwarding information. The forwarding table 30a is comprised of three sub-tables, which will be described in greater detail later with reference to FIGS. 3 through 6.

When a packet is received from the at least one input link interface 100a, the input interface unit 10 carries out physical packet processing and other basic packet processing on the packet and then transmits the processed packet to the forwarding engine 40a.

The packet forwarding unit 50a of the forwarding engine 40a searches for a forwarding entry corresponding to an IP destination address of the packet received from the network interface unit 14 by referring to the forwarding table 30a, which is comprised of three sub-tables. If there exists a forwarding entry corresponding to the IP destination address of the packet, the packet forwarding unit 50a processes the packet using next hop information and basic packet processing information provided by the forwarding entry and then transmits the processed packet to the switch interface unit 16. The protocol packet processing unit 60a processes an internal routing protocol, and the error processing unit 70a determines the packet as an error packet and abandons the packet if forwarding information is not set in the IP destination address of the packet.

The network interface unit 14 receives the packet forwarded from the forwarding engine 40a and then transmits the received packet, also receives the packet from the input link and transmit the packets to the forwarding engine 40a. The switch interface unit 16 transmits the packet which has been through the above IP address lookup process to an input port of a switch included in the switch fabric unit 80, also transmits the packets received from the switch output port of a switch to the forwarding engine 40a.

Figure 3:
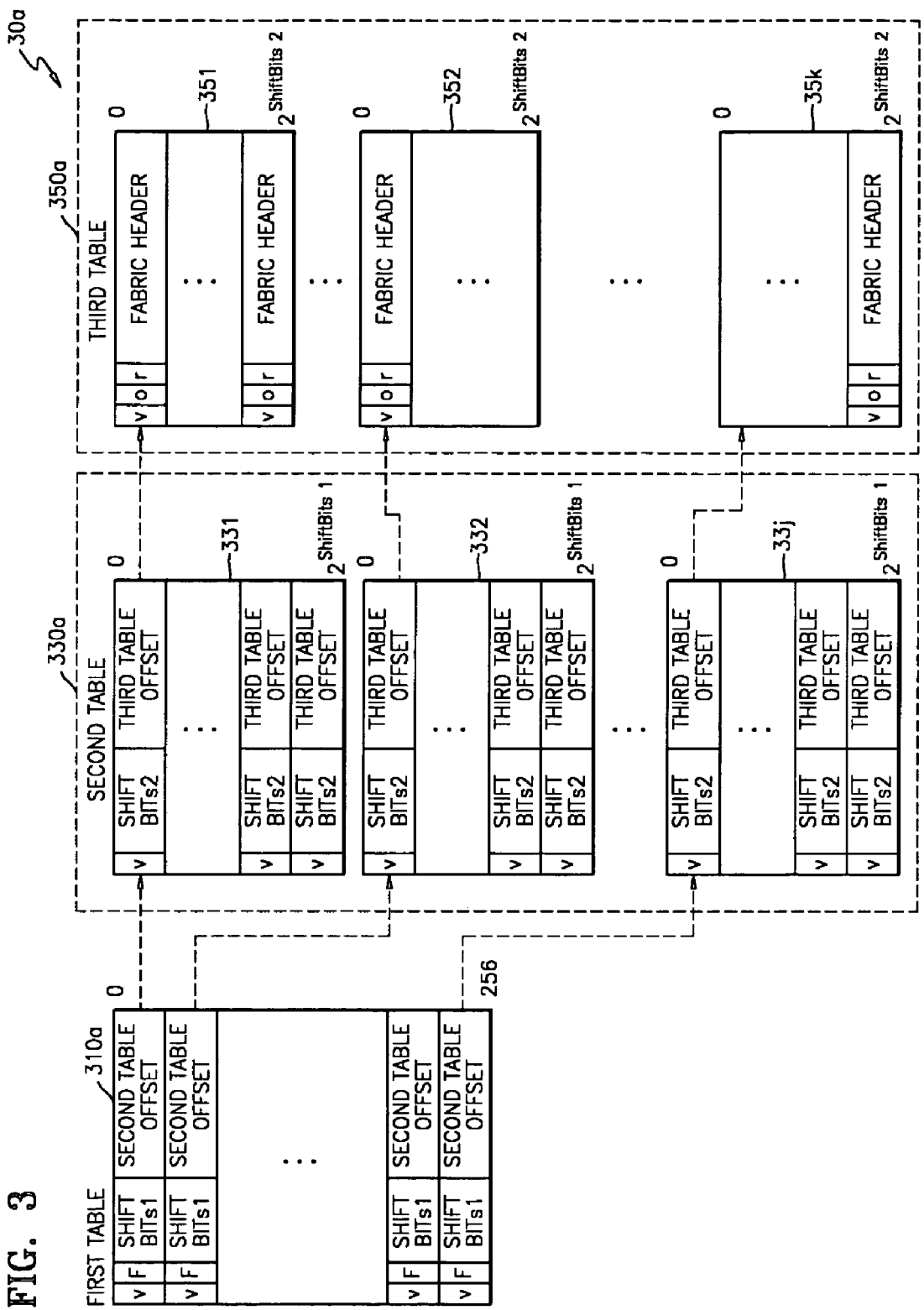
FIG. 3 is a diagram illustrating the structure of a forwarding table of FIG. 1 or 2.

FIG. 3 is a diagram illustrating the structure of the forwarding table 30a of FIG. 1 or 2. Referring to FIG. 3, the forwarding table 30a has a three-layer table architecture comprised of first, second, and third tables 310a, 330a, and 350a.

The first table 310a is a lookup table for 8 most significant bits (MSBs) of an IP address, the second table 330a is a lookup table for ninth through twentieth bits of the IP address, and the third table 350a is a lookup table for 12 least significant bits (LSBs) of the IP address. The forwarding table 30a has multi-bit trie structure. The stride of each level of the multi-bit trie structure of the forwarding table 30a may be differently determined in consideration of the optimization and updating of memory.

Figure 4:
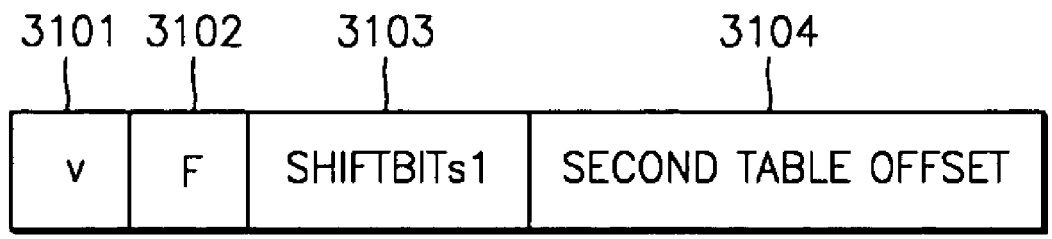
FIGS. 4 through 6 are diagrams illustrating entry structures included in first through third tables, respectively, of FIG. 3.
Figure 5:
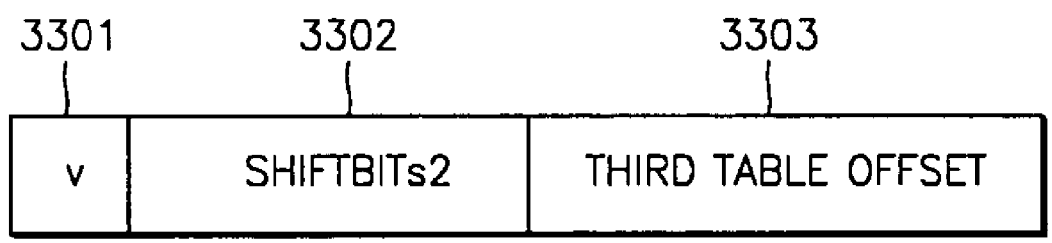
Figure 6:
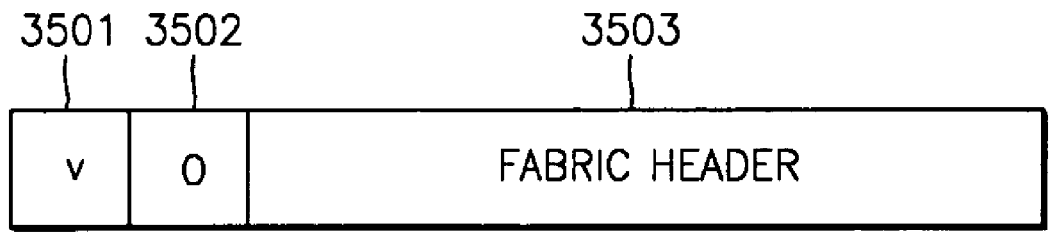

FIGS. 4 through 6 are diagrams illustrating entry structures of the first through third tables 310a, 330a, and 350a, respectively, of FIG. 3.

Referring to FIGS. 3 and 4, the first table 310a, which is a lookup table for most significant 8 bits of an IP address, is comprised of 32-byte entries, i.e., 256 ($2^8$) entries.

Each of the entries of the first table 310a includes four fields, i.e., a valid bit field 3101, which accounts for one bit, a flag bit field 3102, which accounts for one bit, a first shift bits field (ShiftBits1) 3103, which accounts for four bits, and a second table offset bit field 3104.

The valid bit field 3101 indicates whether or not forwarding information corresponding to each of the entries exists in a packet. A packet that attempts to look up an entry for which a valid bit 3101 has not been set is transmitted to a host processor or to the error processing unit 70a so that it can be abandoned.

The flag bit field 3102 indicates whether or not an entry designated by the second table offset bit field 3104 has next hop information. Since an 8-bit prefix is rare, the flag bit field 3102 may not be in use, in which case each of the entries of the first table 310a is comprised of only three fields, i.e., the valid bit field 3101, the first shift bits field 3103, and the second table offset bit field 3104.

The first shift bits field 3103 indicates the number of bits of an IP address that are necessary for looking up an entry in the second table 330a. The first shift bits field 3103 indicates by how many bits an IP address is to be shifted. In other words, the first shift bits field 3103 is used for shifting all bits of an IP address that do not need to be compared with entries in the second table 330a during IP lookup process, so as to express the rest bits to be compared with entries in the second table 330a except for 8 most significant bits of the IP address that have already been compared in the first table 310a. Since the first shift bits field 3103 only indicates the number of shift bits of twelve bits except for the 8 most significant bits of the IP address, four bits are enough to constitute the first shift bits field 3103.

The second table offset bit field 3104 indicates an offset of each sub-table (331 through 33j) of the second table 330a from a start address. In the case of using the second table offset bit field 3104 as a pointer for memory, it is possible to provide at most 64 MB memory addresses ranging from 0 to $2^{26}$. Therefore, in the present invention, a base address, which serves as a bridge between an operating system and an input/output device, is used for expressing an offset_so that the second table 330a can be located within a 64 MB range from the base address.

The first table 310 further includes a final bit field (not shown) which indicates a table next to the first table 310 is the last one. If the final bit field is detected in the first table 310a, an IP address lookup operation is carried out by the third table 350a rather than the second table 330a, a process which will be described in greater detail later with reference to FIG. 7 (steps 3180 and 3190 of FIG. 7, in particular).

Referring to FIGS. 3 and 5, the size of the second table 330a is determined by the first shift bits field 3103 of the first table 310a. In other words, the second table 330a has as many four-byte entries as $2^{ShiftBits1}$ for each of the $2^8$ entries of the first table 310a. Thus, in the worst case, the second table 330a may have $2^{12}$ four-byte entries for each of the $2^8$ entries of the first table 310a, in which case memory which can store a maximum of $2^{20}$ four-byte entries, including all the entries of the first and second tables 310a and 330a, i.e., 4 MB memory, is required. However, as shown in Table 1 below, a typical forwarding table only has about 110 entries whose most significant 8 bits are different from one another's.

Table 1 shows three different border gateway protocol (BGP), i.e., AS286, AS1221, AS4637 published on Oct. 18, 2002, and the number of entries of each of the BGP tables whose most significant 8 bits are different from one another's.

TABLE 1

| AS | Number of Entries Whose Most Significant 8 Bits Are Different from One Another's |
| --- | --- |
| AS286 | 106 |
| AS1221 | 110 |
| AS4637 | 109 |

Supposing that the first and second tables 310a and 330a each has 110 entries, the memory consumption of each of the first and second tables 310a and 330a is a maximum of 1.7 MB. However, each of the 110 entries of the first table 310a does not always have $2^{12}$ entries in the second table 330a. Therefore, the memory consumption of the first and second tables 310a and 330a may vary depending on the number of second table entries provided for each of the 110 entries of the first table 310a, which is shown in Tables 2 through 4 below.

Tables 2 through 4 show different memory consumptions of IP address lookup systems, respectively, adopting BGP data obtained from AS286, AS1221, and AS4637, respectively. In Table 2 through 4, the stride of the first table 310a is fixed at 8, and the stride of the second table 330a is varied between 8 and 16.

TABLE 2

| Second Table Stride | Second Table Memory | Third Table Memory | Total Memory |
| --- | --- | --- | --- |
| 8 | 2,204 | 13,520,976 | 13,523,196 |
| 10 | 2,204 | 6,372,272 | 6,374,494 |
| 12 | 34,960 | 3,075,072 | 3,110,052 |
| 14 | 231,548 | 1,814,128 | 2,045,698 |
| 16 | 20,416,280 | 1,463,184 | 21,879,488 |

TABLE 3

| Second Table Stride | Second Table Memory | Third Table Memory | Total Memory |
| --- | --- | --- | --- |
| 8 | 2,480 | 74,928,544 | 74,931,040 |
| 10 | 6,572 | 36,905,728 | 36,912,318 |
| 12 | 22,948 | 16,804,880 | 16,827,848 |
| 14 | 186,776 | 7,927,360 | 8,114,158 |
| 16 | 21,157,972 | 3,574,064 | 24,732,060 |

TABLE 4

| Second Table Stride | Second Table Memory | Third Table Memory | Total Memory |
| --- | --- | --- | --- |
| 8 | 1,456 | 15,496,768 | 15,498,240 |
| 10 | 13,732 | 6,950,016 | 6,963,766 |
| 12 | 38,296 | 3,314,064 | 3,352,380 |
| 14 | 202,124 | 1,862,480 | 2,064,626 |
| 16 | 20,911,140 | 1,440,384 | 22,351,548 |

As shown in Tables 2 through 4, the IP address lookup system according to the present invention has less memory consumption than a conventional IP address lookup system having a two-layer table architecture does (Tables 5 through 7.

Referring to FIG. 5, each entry constituting the second table 330a includes three fields, i.e., a valid bit field 3301, a second shift bits field (ShiftBits2) 3302, and a third table offset bit field 3303.

The valid bit field bit field 3301 of each entry of the second table 330a, like the valid bit field of each of the entries of the first table 310a, indicates whether or not each entry is valid. A packet which attempts to look up an invalid entry is transmitted to a host processor or to the error processing unit 70a so that it can be abandoned. The second shift bits field 3302, which indicates by how many bits an IP destination address is to be shifted to determine which bits of the IP destination address are to be compared with each entry of the third table 350a. The third table offset bit field 3303, which indicates an offset from the first table 310a, is used for indicating a start address of a sub-table of the third table 350a.

Referring to FIGS. 3 and 6, the size of the third table 350a is determined by the second shift bits field 3302 of the second table 330a. In other words, the third table 350a has as many sixteen-byte entries as $2^{ShiftBits2}$ for each entry of the second table 330a.

Each entry constituting the third table 350a includes three fields, i.e., a valid bit field 3501, an ours bit field 3502, and a fabric head field 3503.

The valid bit field 3501, like its counterparts 3101 and 3301, indicates whether or not each entry is valid. A packet which attempts to look up an invalid entry is transmitted to a host processor or to the error processing unit 70a so that it can be abandoned. The ours bit field 3502 is used as an interface indicating bit which indicates interface information for each entry of the third table 350a. The fabric header field 3503 indicates a 6-byte next hop media access control (MAC) address and additional header information to be used by the switch fabric unit 80 of FIG. 1. The fabric header field 3503 may include much more than the 6-byte next hop MAC address and the additional header information, if necessary. Alternatively, the fabric header field 3503 may have a smaller size if it does not need to include much information.

Figure 7:
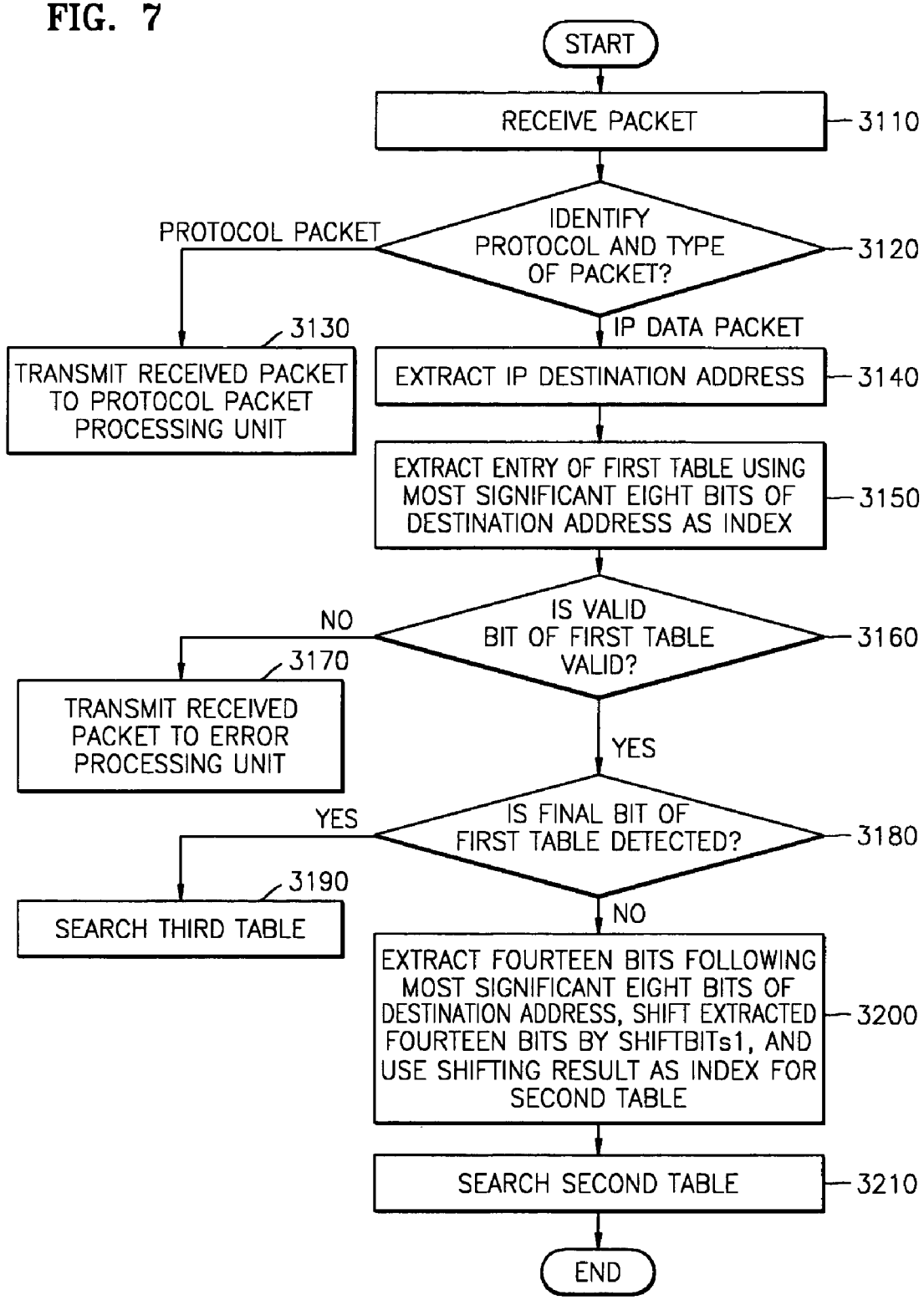
FIG. 7 is a flowchart of an IP address lookup method using the first table of FIG. 3.
Figure 8:
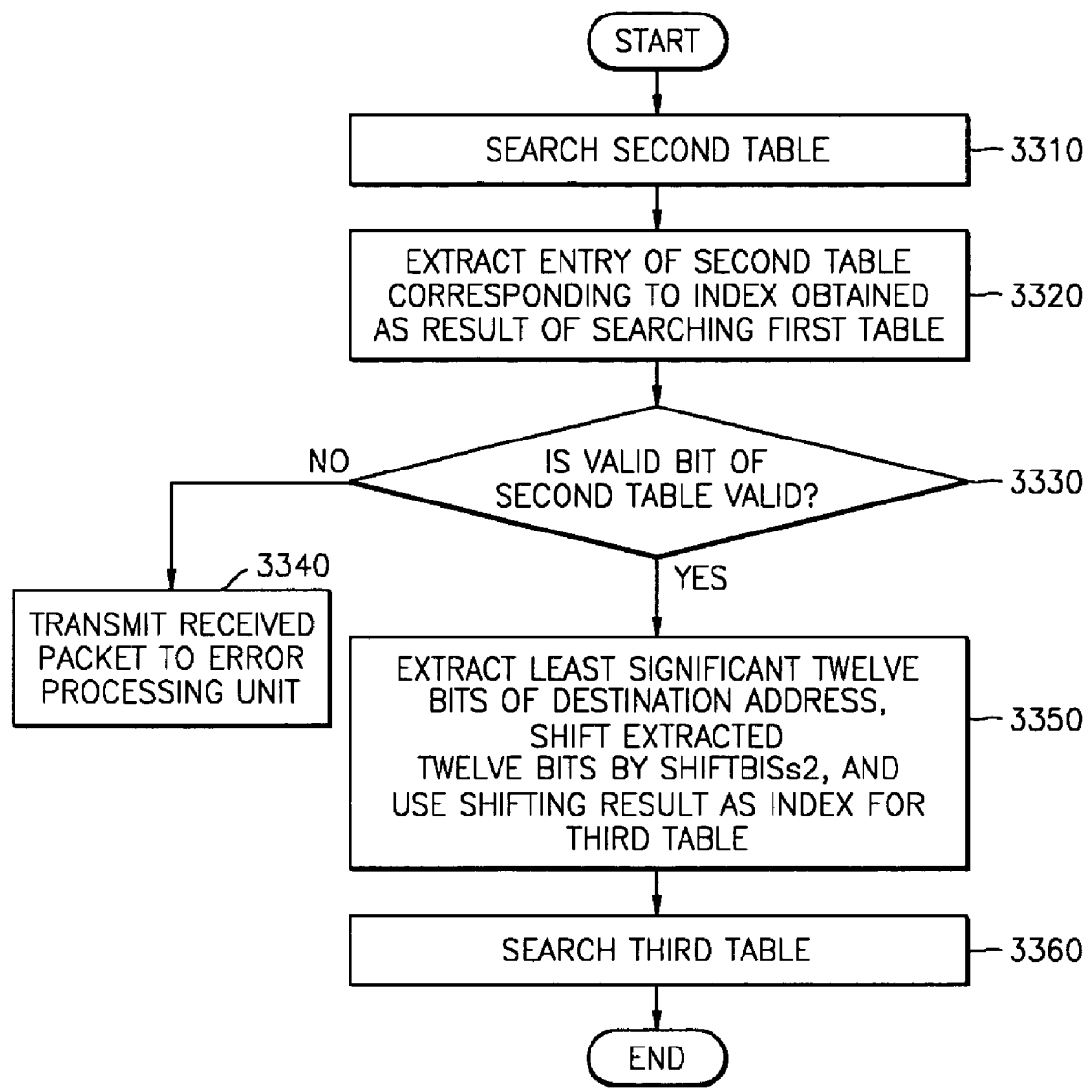
FIG. 8 is a flowchart of an IP address lookup method using the second table of FIG. 3.
Figure 9:
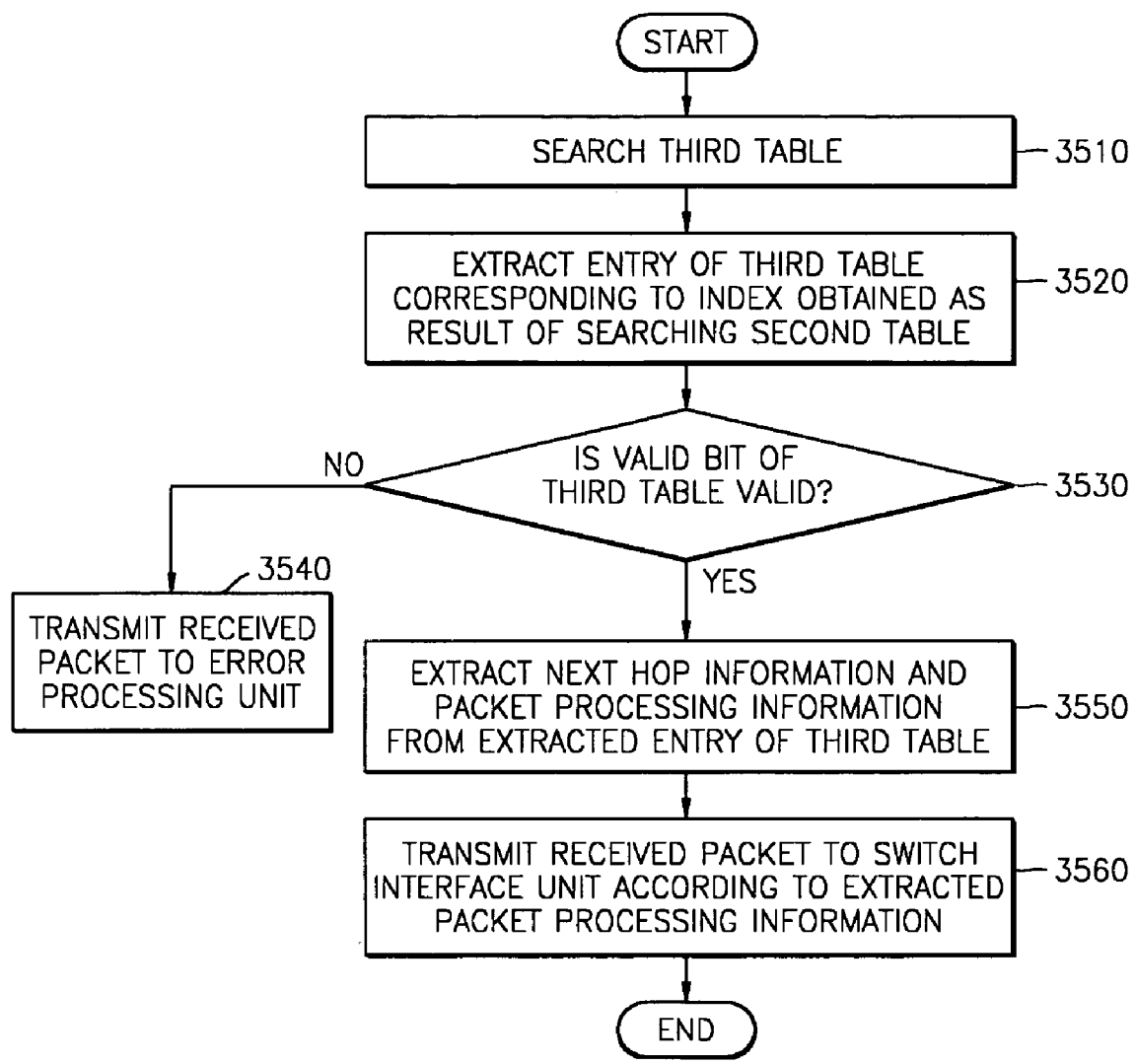
FIG. 9 is a flowchart of an IP address lookup method using the third table of FIG. 3.

FIGS. 7 through 9 are flowcharts illustrating an IP longest prefix match lookup method, using a forwarding table having a three-layer table architecture, according to a preferred embodiment of the present invention. More specifically, FIG. 7 is a flowchart of an IP address lookup method using the first table 310a of FIG. 3, FIG. 8 is a flowchart of an IP address lookup method using the second table 330a of FIG. 3, and FIG. 9 is a flowchart of an IP address lookup method using the third table 350a of FIG. 3.

Referring to FIG. 7, the router 1 of the present invention receives a packet via the input interface unit 10 in step 3110. In step 3120, the router 1 identifies a protocol and the type of the received packet. If it is a protocol packet, the received packet is transmitted to the protocol packet processing unit 60a so that it can be processed by the protocol packet processing unit 60a. If the received packet is an IP data packet, a destination address is extracted from the IP data packet in step 3140.

After extracting the destination address from the received packet in step 3140, an entry of the first table 310a is extracted in step 3150 by using eight most significant bits of the destination address as an index. For example, supposing that the destination address is "A.B.C.D", the eight most significant bits of the destination address (i.e., A) are used as an index for the first table 310a. The extracted entry of the first table 310a includes a valid bit field, a second table offset bit field for indicating the location of the second table 330a, and first shift bits field, as shown in FIG. 4. Here, the second table offset bit field indicates the starting point of a sub-table of the second table 330a pointed at by the extracted entry of the first table 310a, and the first shift bits indicates the detailed location of the sub-table of the second table 330a. For example, let us assume that a prefix of a forwarding entry has a length of 24 bits. Then, since there is a need to compare 12 bits with entries of the second table 330a, the first shift bits field in the first table 310a has a value of 0, and the second table offset bit field indicates a starting point of a sub-table of the second table 330a having $2^{12}$ entries.

Thereafter, it is checked whether or not the valid bit field included in the extracted entry of the first table 310a is valid in step 3160. If the valid bit field is determined as being invalid, the received packet is transmitted to the error processing unit 70a in step 3170 so that it can be abandoned. Otherwise, it is checked in step 3180 whether or not a final bit of the first table 310a has been detected.

If the final bit of the first table 310a has been detected, the third table 350a is searched. Otherwise, fourteen bits following the most significant 8 bits of the destination address are extracted and then shifted by as much as ShiftBits1 of the first table 310a. A result of the shifting is used as an index for the second table 330a in step 3200. Thereafter, the second table 330a is searched using the index in step 3210.

Referring to FIG. 8, the second table 330a is searched in step 3310. An entry corresponding to the index for the first table 310a obtained in step 3200 of FIG. 7 is extracted from the second table 330a in step 3320. Thereafter, in step 3330, it is determined whether or not a valid bit of the extracted entry of the second table 330a is valid in step 3330.

If the valid bit of the extracted entry is determined as being invalid, the received packet is transmitted to the error processing unit 70a in step 3340 so that it can be abandoned. Otherwise, least significant 12 bits of the destination address are extracted and then shifted by as much as ShiftBits2 of the second table 330a. A result of the shifting is used as an index for the third table 350a in step 3350. In step 3360, the third table 350a is searched using the index.

In other words, supposing that the destination address of the input IP data packet is "A.B.C.D", all bits of the destination address except for the eight most significant bits that have already been compared with the entries of the first table 310a, i.e., 'A', and the four least significant bits of 'C', and 'D' that are to be compared with entries of the third table 350a, are shifted by as much as ShiftBits1. Then, a result of the shifting is used as an index for a sub-table of the second table 330a. An entry designated by the index includes a second shift bits field (ShiftBits2) and a third table offset bit field for indicating the location of the third table 350a (see FIG. 5). The third table offset bit field indicates a starting point of a sub-table of the third table 350a pointed at by the extracted entry of the second table 330a, and the second shift bits field ShiftBits2 indicates the detailed location of the sub-table of the third table 350a. When a prefix of a forwarding entry is as long as 24 bits, the second shift bits field has a value of 8, which is obtained as follows.

For example, when the length of a prefix is 24 bits, the index for the first table 310a is 8 bits, and the index for the second table 330a is 12 bits, four bits need to perform comparison in the third table 350a. In order to compare the four bits with entries of the third table 350a, 4 is subtracted from 12, which is a maximum number of comparison bits of the third table 350a. Then, the number of bits that need to be shifted is 8.

Referring to FIG. 9, in step 3510, the third table 350a is searched. In step 3520, an entry of the third table 350a corresponding to the index for the second table 330a obtained in step 3350 of FIG. 8 is extracted. Supposing that a destination address of an input IP data packet is "A.B.C.D", four most significant bits of 'C', and 'D' rather than 'A' that has been compared in the first table 310a and 'B' that has already compared in the second table 330a are shifted by ShiftBits2, and a result of the shifting is used as an index for a sub-table of the third table 350a. An entry of the third table 350a designated by the index includes a valid bit field and a fabric header field containing additional header information, as shown in FIG. 6.

In step 3530, it is checked whether or not a valid bit of the extracted entry is valid. If the valid bit of the extracted entry is determined as being invalid, the input IP data packet is transmitted to the error processing unit 70a in step 3450 so that it can be abandoned. Otherwise, next hop information and packet processing information are extracted from the extracted entry of the third table 350a in step 3550. In step 3560, the input IP data packet is transmitted to the switch interface unit 16 according to the extracted packet processing information.

As described above, in the IP address lookup method according to the present invention, next hop information and packet processing information are obtained by searching for a forwarding table based on a three-layer table architecture using a destination address of an input IP data packet.

When it comes to an IP address lookup, there is a need to consider three factors, i.e., the speed of searching for an IP address, the amount of memory consumed in management of a forwarding table, and updating of the forwarding table if forwarding entries are varied. In the present invention, a forwarding table is comprised of three sub-tables and an IP address lookup is carried out using the forwarding table so as to prevent such problems as low search speed, considerable memory consumption, and difficulty in updating the forwarding table. The memory consumption of the present invention is compared with that of the prior art in which a forwarding table having a two-layer table architecture is adopted.

Tables 5 through 7 show different memory consumptions of conventional IP address lookup systems, respectively, adopting BGP data obtained from AS286, AS1221, and AS4637, respectively. Here, the conventional IP address lookup systems adopt a two-layer table architecture.

TABLE 5

| Primary Table Stride | Primary Table Memory | Secondary Table Memory | Total Memory |
| --- | --- | --- | --- |
| 16 | 262,144 | 13,520,976 | 13,783,120 |
| 18 | 1,048,576 | 6,372,272 | 7,420,848 |

TABLE 5-continued

| Primary Table Stride | Primary Table Memory | Secondary Table Memory | Total Memory |
|---|---|---|---|
| 20 | 4,194,304 | 3,075,072 | 7,269,376 |
| 22 | 16,777,216 | 1,814,128 | 18,591,344 |
| 24 | 67,108,864 | 1,463,184 | 68,572,048 |

TABLE 6

| Primary Table Stride | Primary Table Memory | Secondary Table Memory | Total Memory |
|---|---|---|---|
| 16 | 262,144 | 74,928,544 | 75,190,688 |
| 18 | 1,048,576 | 36,905,728 | 37,954,304 |
| 20 | 4,194,304 | 16,804,880 | 20,999,184 |
| 22 | 16,777,216 | 7,927,360 | 24,704,576 |
| 24 | 67,108,864 | 3,574,064 | 70,682,928 |

TABLE 7

| Primary Table Stride | Primary Table Memory | Secondary Table Memory | Total Memory |
|---|---|---|---|
| 16 | 262,144 | 15,496,768 | 15,758,912 |
| 18 | 1,048,576 | 6,950,016 | 7,997,592 |
| 20 | 4,194,304 | 3,314,064 | 7,508,368 |
| 22 | 16,777,216 | 1,862,480 | 18,639,696 |
| 24 | 67,108,864 | 1,440,384 | 68,549,248 |

As shown in Tables 2 through 7, the IP address lookup method using a fowarding table having a three-layer table architecture according to the present invention can reduce memory consumption more considerably than the prior art using a fowarding table having a two-layer table architecture. In addition, the IP address lookup method of the present invention provides more advantages in terms of updating of the forwarding table than the prior art does.

For example, in the case of applying BGP data obtained from AS286 to an IP lookup, as shown in Tables 2 and 5, the total memory consumption of the present invention ranges from a minimum of 2,045,698 bytes to a maximum of 21,879,488 bytes, while total memory consumption of the prior art ranges from a minimum of 7,269,376 bytes to a maximum of 68,572,048 bytes. In addition, in the case of applying BGP data obtained from AS1221 to an IP address lookup, as shown in Tables 3 and 6, the total memory consumption of the present invention ranges from a minimum of 8,114,158 bytes to a maximum of 74,931,040 bytes, while the total memory consumption of the prior art ranges from a minimum of 8,114,158 bytes to a maximum of 74,931,040 bytes. Moreover, in the case of applying BGP data obtained from AS4637 to an IP address lookup, the total memory consumption of the present invention ranges from a minimum of 2,064,626 bytes to a maximum of 22,351,548 bytes, while the total memory consumption of the prior art ranges from a minimum of 7,508,368 bytes to a maximum of 68,549,248 bytes.

Even if a forwarding table used in the prior art is optimized by adjusting the stride of a primary table of the forwarding table, the minimum amount of memory required for an IP address lookup in the prior art is still larger than the amount of memory required for an IP address lookup in the present invention.

In addition, a two-layer table architecture adopted in the prior art requires a table used by a forwarding engine for an IP address lookup and another table for updating a forwarding table. Therefore, the amount of memory consumed in a real setting is twice as much as the calculated memory consumption shown above. On the other hand, in the present invention, additional memory is only necessary for the size of each sub-table constituting a second table and the size of each sub-table constituting a third table require additional memory. In other words, in the present invention, a total of 32 KB, including 16 KB memory for $2^{12}$ entries of the second table and 16 KB memory for $2^{12}$ entries of the third table, is additionally required. Here, $2^{12}$ indicates a maximum size of each sub-table of the second table or the third table.

In the prior art, it takes a while to update a forwarding table because an entire table architecture needs to be reconstructed even when only one forwarding entry is varied. However, in the present invention, it is relatively easy to update a forwarding table because only a sub-table that includes a varied forwarding entry needs to be changed.

So far, only a case where an IP address lookup system having a triple data structure is installed in an input interface unit of a router has been described in greater detail as an embodiment of the present invention. However, the IP address lookup system of the present invention can be installed in an output interface unit of the router or can be installed in both the input and output interface units of the router.

The present invention can be realized as computer-readable codes stored on a computer-readable recording medium. The computer-readable recording medium includes all kinds of recording devices on which data can be stored in a computer-readable manner. For example, the computer-readable recording medium includes ROM, RAM, CD-ROM, a magnetic tape, a floppy disk, an optical data storage, and a carrier wave (such as data transmission through the Internet). In addition, the computer-readable recording medium can be distributed over a plurality of computer systems connected to a network, and computer-readable codes can be stored on and executed from the computer-readable recording medium in a decentralized manner.

What is claimed is:

1. An IP address lookup system, comprising: a forwarding table which has a three-layer table architecture so that it can search for each address group that constitutes an IP destination address of an input packet; and a forwarding engine which obtains packet processing information and next hop information for the input packet by searching for the forwarding table using the IP destination address as a search key, wherein the forwarding table comprises: a first table which is used for looking up eight most significant bits of the IP destination address; a second table which is used for looking up ninth through twentieth bits of the IP destination address; and a third table which is used for looking up twelve least significant bits of the IP destination address.

2. The IP address lookup system of claim 1 being installed in an input interface unit or an output interface unit of a router.

3. The IP address lookup system of claim 2, wherein the input interface unit comprises at least one input link interface including the forwarding table and the forwarding engine.

4. The IP address lookup system of claim 2, wherein the output interface unit comprises at least one output link interface including the forwarding table and the forwarding engine.

5. The IP address lookup system of claim 1 further comprising: a routing information collection and forwarding information generation unit which collects routing information using a routing protocol and processes the collected routing information into forwarding information; and a forwarding table management unit which stores the forwarding information in the forwarding table.

6. The IP address lookup system of claim 1, wherein the first through third tables are updated when their respective forwarding entries are varied.

7. The IP address lookup system of claim 1, wherein the first table includes $2^8$ 32-byte entries.

8. The IP address lookup system of claim 7, wherein the first table comprises: a valid bit which indicates whether or not each entry constituting the first table is valid; a first shift bit which indicates by how many bits the IP destination address is to be shifted to determine which bits of the IP destination address are to be compared with entries of the second table; and a second table offset bit which indicates an offset of a plurality of sub-tables of the second table from a start address.

9. The IP address lookup system of claim 8, wherein the first table further comprises a flag bit which indicates whether or not an entry designated by the second table offset bit includes next hop information.

10. The IP address lookup system of claim 1, wherein the first table further comprises a final bit which indicates a table next to the first table is a last one.

11. The IP address lookup system of claim 8, wherein when ShiftBits1 represents the first shift bit, the second table includes as many 4-byte entries as $2^{ShiftBits1}$ for each of the entries of the first table.

12. The IP address lookup system of claim 11, wherein the second table comprises: a valid bit which indicates whether or not each entry constituting the second table is valid; a second shift bit which indicates by how many bits the IP destination address is to be shifted to determine which bits of the IP destination address are to be compared with entries of the third table; and a second table offset bit which indicates an offset of a plurality of sub-tables of the third table from the first table.

13. The IP address lookup system of claim 12, wherein when ShiftBits2 represents the second shift bit, the third table includes as many 16-byte entries as $2^{ShiftBits2}$ for each of the entries of the second table.

14. The IP address lookup system of claim 13, wherein the third table comprises: a valid bit which indicates whether or not each entry constituting the third table is valid; an interface indicating bit which indicates interface information for each entry of the third table; and a fabric header which indicates a next hop media access control address and additional header information to be used by a switch fabric unit.

15. The IP address lookup system of claim 1, wherein the forwarding engine comprises: a packet forwarding unit which searches the forwarding table for a forwarding entry corresponding to the IP destination address of the input packet and forwards the input packet by using next hop information and packet processing information provided by the searched forwarding entry; a protocol packet processing unit which processes an internal routing protocol; and an error processing unit which determines the input packet as an error packet and abandons the input packet if forwarding information is not set in the IP destination information.

16. The IP address lookup system of claim 15, wherein the packet forwarding unit searches for an entry, which is a longest match for the IP destination address, using an IP longest prefix match method.

17. An IP address lookup method, comprising: (a) extracting an IP destination address from an input IP data packet; (b) extracting entries of a first table corresponding to eight most significant bits of the IP destination address; (c) extracting entries of a second table corresponding to a result of shifting fourteen bits following the eight most significant bits of the IP destination address by as much as a first shift bit; (d) extracting entries of a third table corresponding to a result of shifting twelve least significant bits of the IP destination address by as much as a second shift bit; and (e) extracting next hop information and packet processing information from a searched entry of the third table, wherein the first through third tables constitutes a forwarding table which enables each address group of the IP destination address to be searched for.

18. The IP address lookup method of claim 17, wherein the first through third tables are updated when their respective forwarding entries are varied.

19. The IP address lookup method of claim 17, wherein in steps (b), (c), and (d), an entry, which is a longest match for the IP destination address, is searched for using an IP longest prefix match method.

20. The IP address lookup method of claim 17, wherein the first table comprises: a valid bit which indicates whether or not each entry constituting the first table is valid; a first shift bit which indicates by how many bits the IP destination address is to be shifted to determine which bits of the IP destination address are to be compared with entries of the second table; and a second table offset bit which indicates an offset of a plurality of sub-tables of the second table from a start address.

21. The IP address lookup method of claim 20, wherein when ShiftBits1 represents the first shift bit, the second table includes as many 4-byte entries as $2^{ShiftBits1}$ for each of the entries of the first table.

22. The IP address lookup method of claim 21, wherein the second table comprises: a valid bit which indicates whether or not each entry constituting the second table is valid; a second shift bit which indicates by how many bits the IP destination address is to be shifted to determine which bits of the IP destination address are to be compared with entries of the third table; and a second table offset bit which indicates an offset of a plurality of sub-tables of the third table from the first table.

23. The IP address lookup method of claim 22, wherein when ShiftBits2 represents the second shift bit, the third table includes as many 16-byte entries as $2^{ShiftBits2}$ for each of the entries of the second table.

24. The IP address lookup method of claim 23, wherein the third table comprises: a valid bit which indicates whether or not each entry constituting the third table is valid; an interface indicating bit which indicates interface information for each entry of the third table; and a fabric header which indicates a next hop media access control address and additional header information to be used by a switch fabric unit.

25. The IP address lookup method of any of claims 20, 22, and 24 further comprising: (f) abandoning the input IP data packet if the valid bit is determined as being invalid.

26. A computer-readable recording medium on which a program enabling the method of claim 17 is recorded.

* * * * *